United States Patent
Duke et al.

(10) Patent No.: US 8,538,658 B2
(45) Date of Patent: *Sep. 17, 2013

(54) CONTROL OF GAS TURBINE ENGINE

(75) Inventors: Brant Duke, Lasalle (CA); Jim R. Jarvo, St. Bruno (CA); Benoit Lachance, Varennes (CA); Harris Shafique, Longueuil (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,043

(22) Filed: Dec. 15, 2011

(65) Prior Publication Data

US 2012/0136550 A1    May 31, 2012

Related U.S. Application Data

(63) Continuation of application No. 12/407,233, filed on Mar. 19, 2009, now Pat. No. 8,099,227.

(51) Int. Cl.
*F02C 9/48* (2006.01)
(52) U.S. Cl.
USPC .......................................................... 701/100
(58) Field of Classification Search
USPC ................. 701/100–104; 477/30; 60/239, 60/243, 734–735; 137/119.07, 119.06
See application file for complete search history.

(56) References Cited

U.S. PATENT DOCUMENTS

| | | |
|---|---|---|
| 2,519,624 A | 12/1948 | Ballantyne et al. |
| 3,568,439 A | 3/1971 | Canale |
| 3,805,519 A | 4/1974 | Plotnick et al. |
| 3,965,673 A | 6/1976 | Friedrich |
| 4,077,202 A | 3/1978 | Schutze |
| 4,202,171 A | 5/1980 | Jurisch et al. |
| 4,270,345 A | 6/1981 | Kast |
| 4,275,558 A | 6/1981 | Hatch et al. |
| 4,296,601 A | 10/1981 | Martin |
| 4,506,504 A | 3/1985 | Nick |
| 4,583,360 A | 4/1986 | Nick |
| 4,612,616 A | 9/1986 | Binns et al. |
| 4,783,957 A | 11/1988 | Harris |
| 5,083,277 A | 1/1992 | Shutler |
| 5,279,107 A | 1/1994 | Meisner et al. |
| 5,440,490 A | 8/1995 | Summerfield |
| 5,768,883 A | 6/1998 | Mayer |
| 5,896,737 A | 4/1999 | Dyer |
| 6,119,446 A | 9/2000 | Shon |
| 6,142,418 A | 11/2000 | Weber et al. |

(Continued)

FOREIGN PATENT DOCUMENTS

| | | |
|---|---|---|
| EP | 63999 | 11/1982 |
| EP | 82785 | 6/1983 |

(Continued)

OTHER PUBLICATIONS

Extended European Search Report; EP Application No. 10250519.5; dated Jun. 2, 2010.

*Primary Examiner* — Yonel Beaulieu

(74) *Attorney, Agent, or Firm* — Norton Rose Fulbright Canada LLP

(57) ABSTRACT

Systems, devices, and methods for controlling a fuel supply for a turbine or other engine using direct and/or indirect indications of power output and optionally one or more secondary control parameters.

8 Claims, 6 Drawing Sheets

(56) References Cited

U.S. PATENT DOCUMENTS

| | | |
|---|---|---|
| 6,357,219 B1 | 3/2002 | Dudd, Jr. et al. |
| 6,389,816 B1 | 5/2002 | McCarty et al. |
| 6,422,023 B1 | 7/2002 | Dudd, Jr. et al. |
| 6,434,473 B1 | 8/2002 | Hattori |
| 6,568,166 B2 | 5/2003 | Jay et al. |
| 6,715,277 B2 | 4/2004 | Zagranski et al. |
| 6,742,340 B2 | 6/2004 | Nearhoof, Sr. et al. |
| 6,745,572 B2 | 6/2004 | Jay et al. |
| 6,786,033 B2 | 9/2004 | Simunek |
| 7,051,535 B2 | 5/2006 | Acker |
| 7,136,738 B2 | 11/2006 | Zagranski et al. |
| 7,406,820 B2 | 8/2008 | Critchley et al. |
| 7,765,052 B2 | 7/2010 | Kaiser et al. |
| 7,823,391 B2 | 11/2010 | Beardsley |
| 8,099,227 B2 * | 1/2012 | Shafique et al. ............ 701/104 |
| 2005/0262825 A1 | 12/2005 | Certain |
| 2007/0113560 A1 | 5/2007 | Steber et al. |
| 2007/0119147 A1 | 5/2007 | Cornwell et al. |
| 2007/0125090 A1 | 6/2007 | Martis et al. |
| 2007/0245746 A1 | 10/2007 | Mollman et al. |
| 2008/0041063 A1 | 2/2008 | Feiz |
| 2008/0147289 A1 | 6/2008 | Feiz |

FOREIGN PATENT DOCUMENTS

| | | |
|---|---|---|
| GB | 781962 | 8/1957 |
| GB | 2059631 | 7/1972 |
| JP | 57-179340 | 11/1982 |

* cited by examiner

CONTROL OF GAS TURBINE ENGINE

CROSS-REFERENCE TO RELATED APPLICATION AND CLAIM OF PRIORITY

The present application is a continuation of U.S. patent application Ser. No. 12/407,233, filed Mar. 19, 2009, now issued as U.S. Pat. No. 8,099,227, the entire contents of which are hereby incorporated by reference.

TECHNICAL FIELD

The application relates to the operation of turbine engines and, more specifically, to methods and apparatus for control of the supply of fuel provided to gas turbine engines using electronic engine control systems.

BACKGROUND

Many new aircraft engines, including both engines currently in development and engines recently certified for flight use, employ electronic engine control systems. As well, older aircraft, designed before electronic control systems were common, are sometimes retrofitted with such systems. Among other advantages, electronic engine control systems can help to reduce pilot workload, provide simpler and more efficient interfaces with modem cockpit control systems, provide improved protection for engines against extreme operating conditions, and enhance prognostic and diagnostic capabilities.

An important parameter to be controlled by an electronic engine controller in a turboprop or turboshaft engine is engine output power (or output torque). Such power is most often controlled through control of the rate of fuel flow provided to the engine.

For measuring and reporting current engine power output, prior art engine controllers have typically employed mechanical transducers, such as phase-shift torque meters. Such mechanical transducers, however, require space and add weight to an engine; the addition of either volume or weight to engines is typically undesirable, particularly in aerospace applications. In a turboprop or turboshaft engine, for example, the use of such transducers can require modification of the reduction gearbox (RGB) and associated components.

SUMMARY

The disclosure provides, in various aspects, methods, systems, and devices for controlling the supply of fuel to engines, including particularly aircraft-mounted turbine engines such as turboshafts or turboprops.

In various aspects, for example, the disclosure provides methods of controlling such fuel supplies, the methods comprising steps of monitoring a differential oil pressure, such as the differential pressure measured across the reduction gear box (RGB), associated with an operating engine, the differential engine oil pressure determined using signals representing at least two measured operating engine oil pressures, to determine whether a change in the monitored differential engine oil pressure has occurred; upon determining that a change in the monitored differential engine oil pressure has occurred, using signals representing at least one other aircraft or engine operating parameter to determine whether the change in differential engine oil pressure corresponds to a desired change in an output power level for the engine; and if it is determined that the change in differential engine oil pressure does not correspond to a desired change in an output power level for the engine, calculating a desired fuel flow rate for the engine and either providing a corresponding command signal to an engine fuel supply controller or causing a current fuel flow rate to be continued for a determined time interval.

In further aspects, the disclosure provides methods of controlling such fuel supplies, in which the methods comprise monitoring a differential oil pressure associated with an operating engine, the differential engine oil pressure determined using signals representing at least two measured operating engine oil pressures, to determine a corresponding indicated engine output power level; monitoring at least one other aircraft or engine operating parameter to determine whether the indicated engine output level corresponds to a desired output power level for the engine; and if the indicated engine output level does not correspond to the desired output power level for the engine, calculating a desired fuel flow rate for the engine and either providing a corresponding command signal to an engine fuel supply controller or causing a current fuel flow rate to be continued for a determined time interval.

In further aspects the disclosure provides systems and devices, including controllers, for controlling the supply of fuel to such engines according, for example, to such methods.

Further details of these and other aspects of the subject matter of this application will be apparent from the detailed description and drawings included below.

DESCRIPTION OF THE DRAWINGS

Aspects of the disclosure are illustrated in the figures of the accompanying drawings, which are meant to be exemplary and not limiting, and in which like references are intended to refer to like or corresponding parts.

DETAILED DESCRIPTION OF THE PREFERRED EMBODIMENTS

Various aspects of embodiments of systems, devices, and methods in accordance with the disclosure are described through reference to the drawings.

Figure 1:
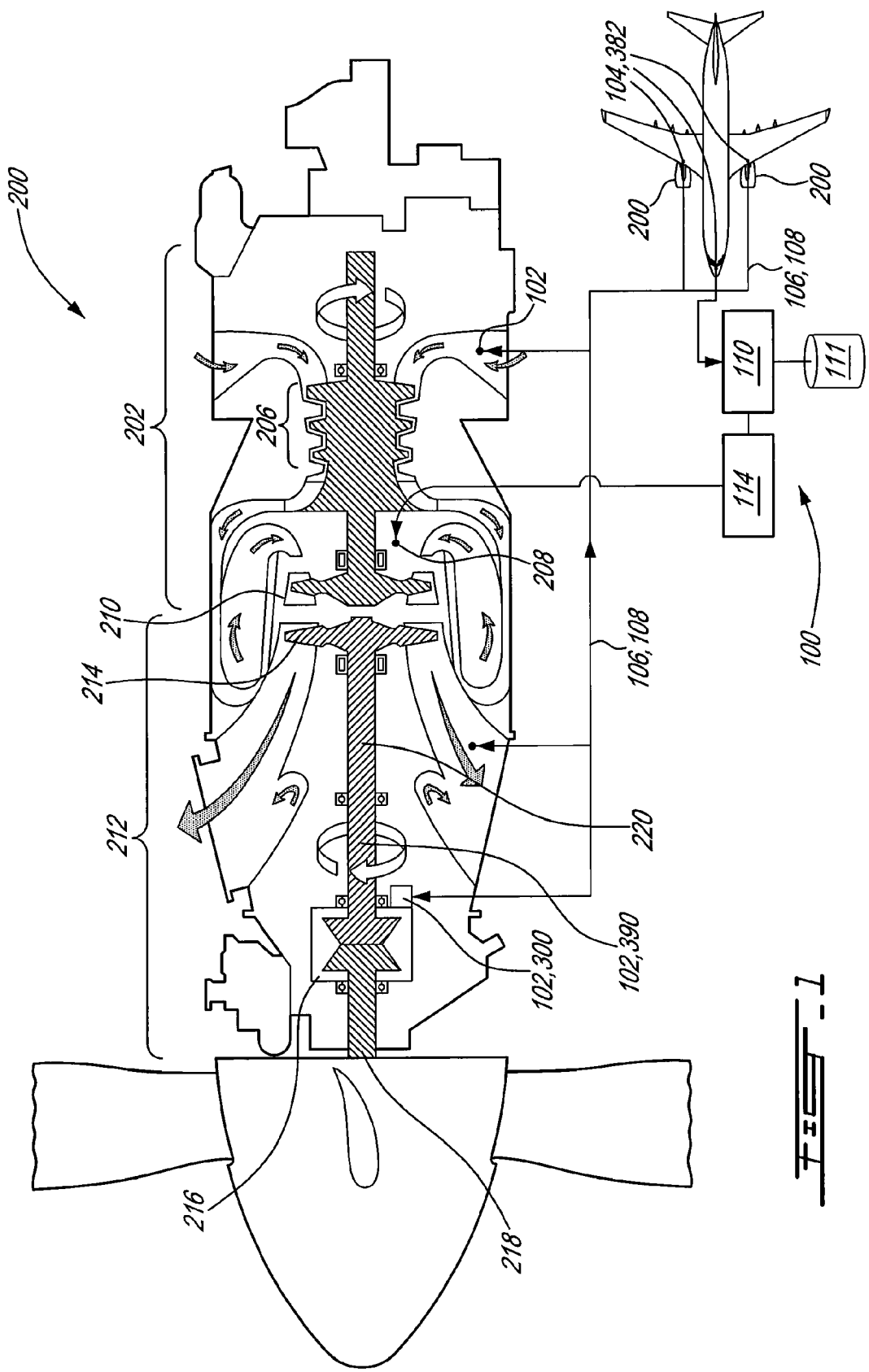
FIG. 1 is a schematic diagram of a gas turbine engine comprising a system for controlling a fuel supply for an aircraft-mounted turbine engine in accordance with the disclosure.

FIG. 1 is a schematic diagram of a system 100 for controlling a fuel supply for an engine 200 in accordance with the disclosure.

In the example shown, turbine engine 200 is a turboprop engine suitable for use in providing primary flight power for an aircraft. In the example, engine 200 comprises a gas generator section 202 and a power module 212. Gas generator section 202 includes an accessory gearbox (not shown), a multi-stage compressor 206, a reverse-flow combustor 208, and a high pressure compressor turbine 210. In the example shown, power module 212 comprises power turbine 214 (which may be multi-stage) and reduction gearbox (RGB) 216 for stepping down the rotational speed of turbine shaft 220 to a speed appropriate for a driving propeller shaft.

The operation and interactions of components 202-220 of engine 200 and other engines suitable for use in implementing systems, devices, and methods according to the disclosure will be well understood by those skilled in the relevant arts. As will be further understood by those skilled in such arts, the systems and methods disclosed herein are suitable for use in controlling fuel supplies for a wide variety of both turbine and non-turbine engines in addition to those described herein.

In a gas turbine engine such as a turboprop engine 200 or a turboshaft engine, engine output power is generally dependent, among other factors, on the rotational speed of gas generator shaft 220. Control of the speed of a gas generator such as that of gas generator section 202, and therefore gas generator shaft 220, of FIG. 1 can be accomplished by regulating the amount of fuel supplied to the combustion chamber (e.g., combustor 208 of FIG. 1) in view of other factors such as altitude, inlet pressure, and inlet temperature.

In systems and methods according to the disclosure, the amount of fuel provided to a combustor (or other fuel injection system), and thereby the engine output power, can be regulated by an electronic engine control system (EEC 110) such as a Full-Authority Digital Electronic Control (FADEC) system. Such EECs 110 can use anyone or more of a number of parameters as input in determining the amount of fuel to be supplied to the combustor in order to achieve or maintain a desired engine power output. Examples of such parameters can include current output power, altitude, inlet and outlet air pressures, and inlet and outlet air temperatures.

As shaft output power can be expressed as:

Shaft output power=(Shaft torque)×(propeller speed), primary desirable factors in controlling fuel supply can include propeller speed (Np) and parameters which are directly proportional to shaft torque, such as differential engine oil pressure measured across the RGB in a turboprop and/or stress and/or strain in the shaft. Thus primary input sources for use by EEC 110 in determining current or desired output power, and thereby desired fuel flow, can include, for example, phase-shift torque meters and/or differential oil pressures transducers placed at, for example, the oil inlet and outlet of the RGB in a turboprop.

Thus, as described below, system 100 for controlling the fuel supply to engine 200, can comprise, among other components, one or more automatic data processors (e.g. EECs) 110 and one or more sensors or other input devices 102, 104 for assessing and/or confirming engine output power levels, for calculating desired fuel flow rates for the engine 200, and for issuing command signals to fuel pumps and/or other fuel control components 114 to cause such calculated desired fuel flow rates to be provided to the engine.

Primary input sensor(s) 102 may be provided for acquiring signals representing engine output power or parameters useful in determining engine output power. Such signals may represent direct measures of output power (as for example in the case of phase-shift torque controllers, differential oil pressures, and or propeller speed indicators), or indirect measures, through measurement of parameters which may be used to deduce output power.

Input sensor(s) 104 can be provided to acquire data signals representing parameters relevant to engine operation or otherwise useful in confirming the current output power; which, for example may be indirectly associated with engine performance, and/or used to confirm conditions in which an engine 200 is operating, and thereby to confirm the meaning of output readings of one or more transducers 102, and thereby confirm current and desired engine output and fuel supply settings. Examples of parameters readable by sensors 104 that can be used to confirm a primary engine power output indication can include vertical or other accelerations at the engine location, main oil pressure, which can for example be affected by aircraft accelerations, and/or the rotational speed Ng of the gas generator, e.g., section 202 in FIG. 1. While main oil pressure and accelerometer readings can be used to acquire information regarding movement of the aircraft or other vehicle in which an engine is mounted, factors such as Ng can be use to confirm whether in fact a significant change in engine operation has occurred.

Figure 2:
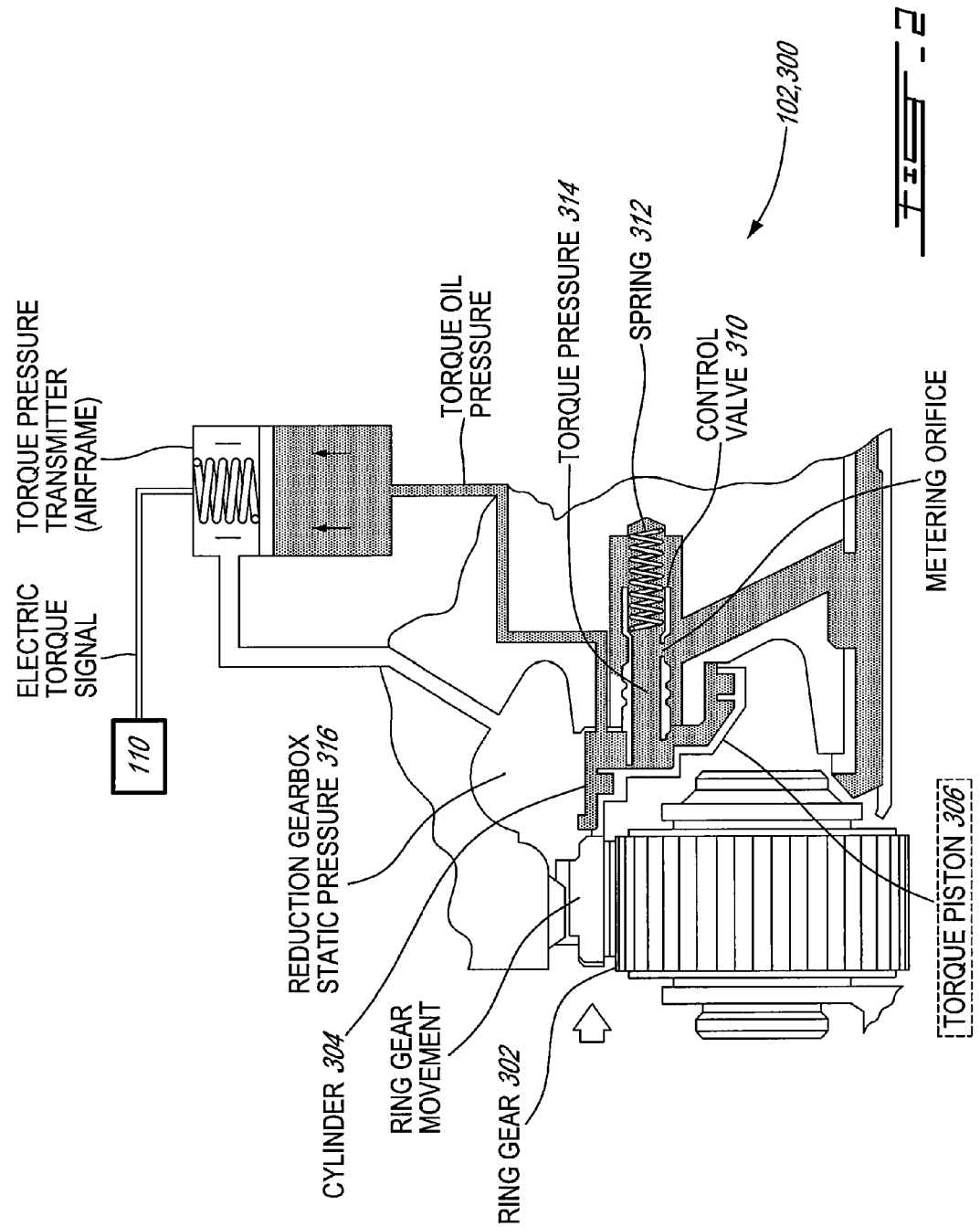
FIG. 2 is a schematic diagram of a differential oil pressure transducer suitable for use in implementing embodiments of systems and methods of controlling a fuel supply for an aircraft-mounted turbine engine in accordance with the disclosure.

In the example shown in FIG. 1, system 100 for controlling the fuel supply of engine 200 comprises an engine output power transducer 102 in the form of a differential oil pressure transducer 300 such as, for example, that shown schematically in FIG. 2. As will be understood by those skilled in the relevant arts, the differential oil pressures provided by transducer 102, 300 can be interpreted as providing a direct measure of the output torque of engine 200, and therefore is directly proportional to engine output power.

Operation of an embodiment of a fuel control system 100 in accordance with the disclosure may be described in conjunction with such a transducer 102, 300. Those skilled in the relevant arts, however, will understand that phase-shift torque meters and other direct measures of engine torque can be used as input sources 102.

In the embodiment shown in FIGS. 1 and 2, differential oil pressure transducer 102, 300 can be disposed proximate a first stage reduction gear 224 of RGB 216, and can comprise a ring gear 302, cylinder 304, piston 306 connected to valve 310, and spring 312. Rotation of ring gear 302 can be resisted by helical splines, which can impart an axial movement of the ring gear and to piston 306. Movement of piston 306 can cause valve 310 to move against spring 312, opening a valve orifice and allowing flow of pressurized oil into torque pressure chamber 314. Movement of piston 306 can continue until the pressure of oil in chamber 314 is proportional to the torque being transmitted to ring gear 302. Because external pressure can vary and can affect the total pressure applied to piston 306, the internal RGB static pressure applied at chamber 316 can be applied to the reverse side of piston 306, resulting in measurement of differential oil pressure in the RGB 216. This RGB differential pressure can be interpreted as a measure of torque applied to output shaft 218 by the RGB 216, and therefore can be used as a control parameter in determining and controlling the amount of fuel supplied to engine 200.

As will be understood by those skilled in the relevant arts, transducers 102, including any transducers 300, can be of any suitable form for accomplishing the purposes described herein; the arrangement shown in FIG. 2 is merely an exemplary embodiment of a single type of transducer that can be used in implementing the methods, systems, and devices disclosed herein.

Figure 3:
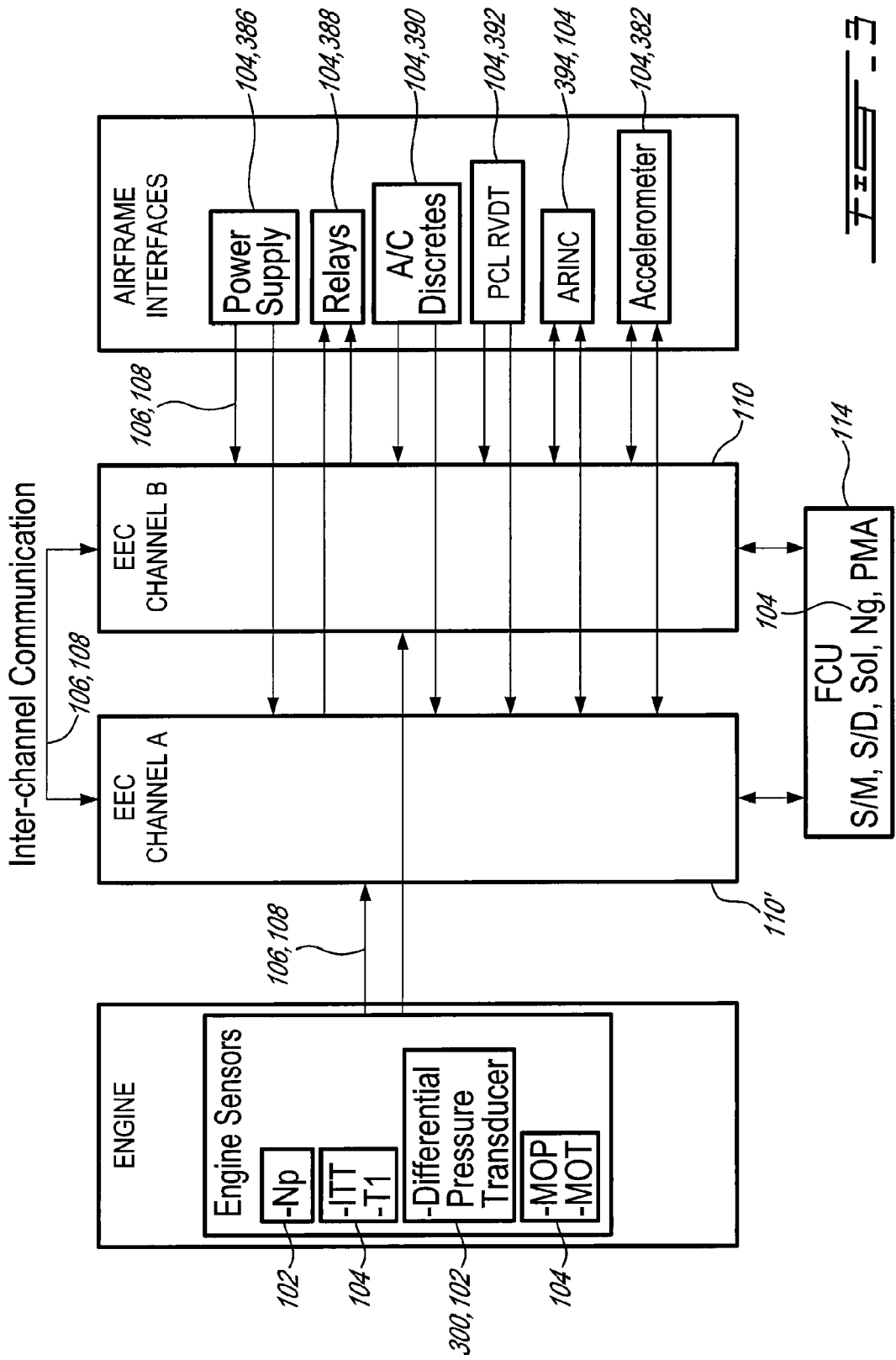
FIG. 3 is a schematic diagram of an embodiment of a system for controlling a fuel supply for an aircraft-mounted turbine engine in accordance with the disclosure.

FIG. 3 is a schematic diagram of a system 100 for controlling a fuel supply for an aircraft-mounted turbine engine in accordance with the disclosure. System 100 is suitable for use, for example, in controlling a fuel supply for an engine such as that shown at 200 in FIG. 1. System 100 comprises one or more sensors 102 for reading and transducing engine operating parameters such as, for example, differential oil pressure (see, for example, sensor 300 of FIGS. 1 and 2), propeller speed Np, and shaft torque (not shown). System 100 can further comprise one or more sensors 104 for reading and transducing other parameters associated with operation of the engine 200, such as, for example, inter-turbine temperature ITT, engine inlet temperature T1, main oil pressure MOP, and main oil temperature MOT; and other parameters such as power supply output 386, relay status 388, A/C discretes 390, cockpit power control lever (e.g., power control lever rotary variable differential transformer PCL RVDT 392), and other avionics devices 394. One or more communications channels 106, 108, such as digital buses, electronic engine controls (EECs) 110, 110' and fuel control units (FCUs) 114 are also provided. In the embodiment shown, redundant EECs 110, 110' are provided.

As will be understood by those skilled in the relevant arts, the various components of system 100 may be implemented, separately or jointly, in any form or forms suitable for use in implementing the systems, devices, and methods disclosed herein. For example, sensors 102, 104 for reading and transducing engine operating parameters such as differential oil pressure, shaft stress and/or strain, compressor inlet pressure, propeller speed Np, inter turbine temperature ITT, compressor inlet temperature T1 or outlet temperature, main oil pressure MOP, and/or main oil temperature MOT may be of any mechanical, hydraulic, electrical, magnetic, analog and/or digital compatible form(s) suitable for use in implementing desired embodiments of the systems, devices, and methods disclosed. For example, as suggested by FIG. 2, a pressure transducer such as differential oil pressure transducer 300 may provide mechanical/visual output for full or partial manual control of a turbine engine; in other embodiments, temperature, pressure, or other sensors providing digital and/or analog electromagnetic and/or mechanical signals representing the measured parameters may be used. Many suitable types of transducers are now known; doubtless others will be developed hereafter.

Selection of suitable sensors, transducers, and/or other devices for monitoring values of parameters 104 will depend, among other factors such as cost, weight, etc., on the nature of the parameters to be monitored; such selection will be well within the scope of those having ordinary skill in the art, once they have been made familiar with this disclosure.

Communications channels 106, 108, such as those between sensors 102, 104 and EEC/processor 110 can comprise any single or redundant communications devices or systems, including for example dedicated, direct-wire connections, serial or parallel buses, and/or wireless data communications components, suitable for accomplishing the purposes described herein. As will be understood by those skilled in the relevant arts, it can be desirable in some applications, particularly aerospace applications, to provide sensors 102, 104, communications channels 106, 108, processors 110, and fuel control units (FCUs) 114 in redundant sets, particularly with respect to devices which generate, transmit, or process electrical signals. It can further be desirable to provide insulators, firewalls, and other protective devices between components of systems 100, and particularly redundant components, so as to preclude multiple failures. Even where a single housing is provided, as in the case for a housing for a differential oil pressure transducer 300, multiple redundant sensors may be provided.

FCU 114 can comprise any relays, switches, and controls, and/or other components, such as pump and/or valve controls, required to control fuel supply at the command of EEC(s) 110, as for example by receiving and appropriately responding to command signals provided by EEC and configured to provide a desired fuel flow to engine 200. Such components and the use of them in implementing the systems and methods disclosed herein will not trouble those of ordinary skill in the art, once they have been made familiar with this disclosure.

EECs 110 may comprise any single, multiple, combination, and/or redundant general or special purpose data processors, such as printed integrated circuit boards and associated or auxiliary components such as volatile and/or persistent data storage devices 111, relays, and input/output devices, suitable for accomplishing the purposes described herein. Such components may comprise any hardware and/or soft- or firmware and data sets, suitable for use in implementing the systems, devices, and methods disclosed herein.

As one example, EEC software contained in the EEC 110 and executed in processors associated therewith may include filters to condition the differential oil pressure signal as required. Noise may be present in the signal due to various phenomena that may appear in the signal at various frequencies. For example, since the differential pressure oil transducer 300 is located above the RGB 216 in close proximity to the propeller, the oil pressure transducer 300 may respond to the frequency with which propeller blades pass the transducer. Pulses within the signal related to such phenomena could easily be filtered via software to ensure the EEC is processing a true output power or torque signal.

A wide variety of suitable transducers, communications units, data processors, memories, relays, communications devices, fuel control devices, and other components are now available, and doubtless others will hereafter be developed. Those skilled in the relevant arts will not be troubled by the selection of suitable components, once they have been made familiar with the contents of this disclosure.

Figure 4:
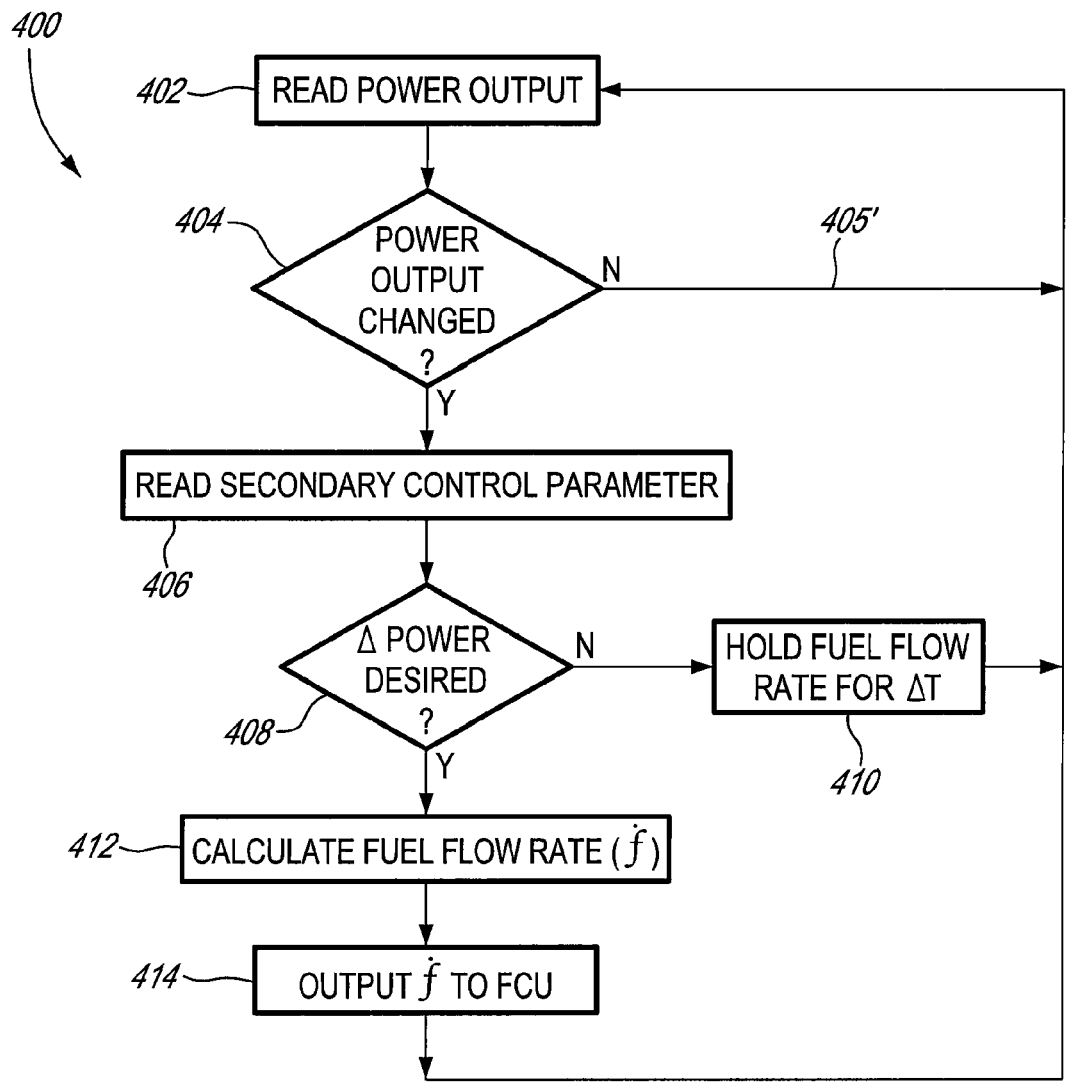
FIGS. 4 and 5 are schematic flow diagrams of embodiments of processes for controlling a fuel supply for an aircraft-mounted turbine engine in accordance with the disclosure.
Figure 5:
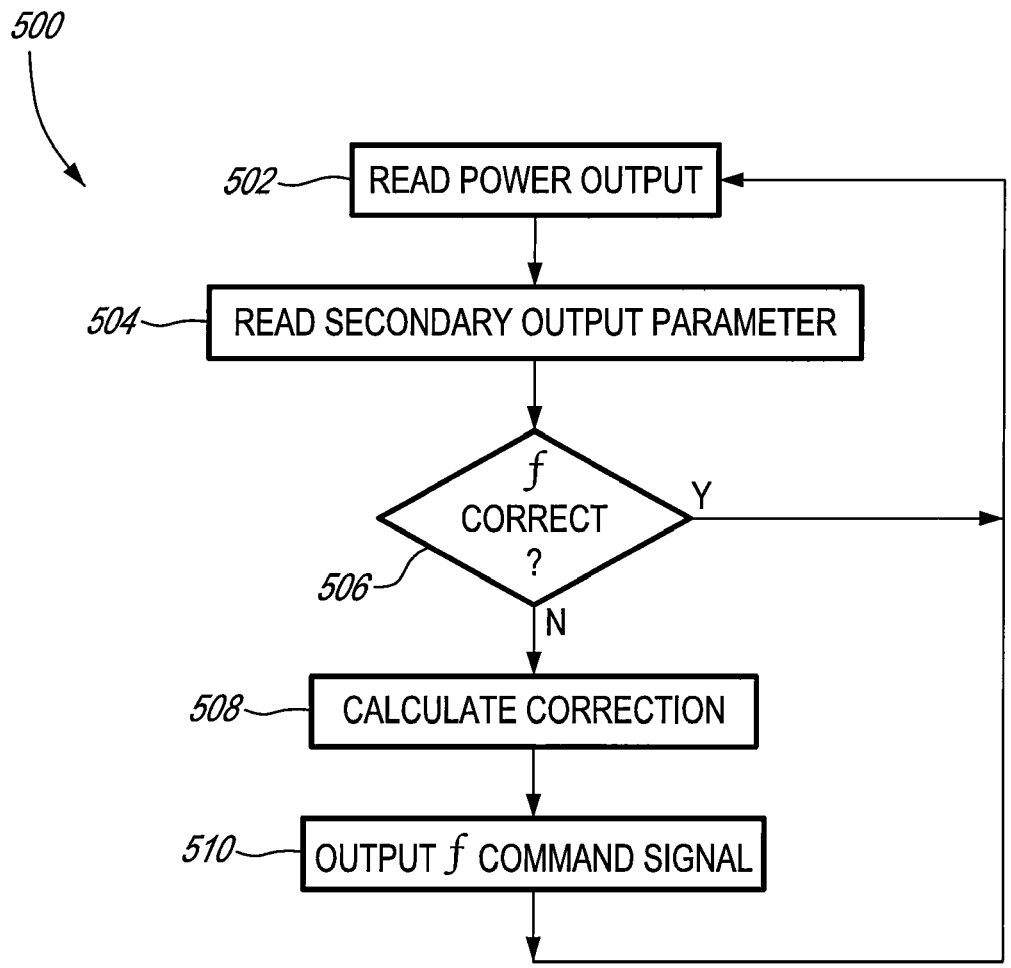

FIGS. 4 and 5 are schematic flow diagrams of exemplary processes 400, 500 for controlling a fuel supply for an aircraft-mounted turbine engine in accordance with the disclosure. Processes 400, 500 are suitable for use, in conjunction with systems 100, in implementing controls for fuel supplies for engines such as that shown at 200 in FIG. 1.

Process 400 depicts a process for controlling a fuel supply for a turbine or other engine using direct and/or indirect, or primary, indications of power output and optionally one or more secondary, or confirmatory, control parameters according to embodiments of the disclosure. At 402, a current value or level of power output of the engine 200 is determined. For example, a direct reading of power output of shaft 218 can be determined using, for example, a mechanical means such as a phase shift torque probe. Alternatively, a proportional measure of power output, such as differential RGB oil pressure, may be employed as a control parameter, in either case using one or more of sensors 102 to provide signals representing any one or more of such parameters to EEC(s) 110 (and 110'). For example, as shown at 402 a differential oil pressure across an RGB may be obtained, using a transducer such as differential oil pressure transducer 102, 300 of FIG. 2 to provide for processing by EEC(s) 110 and/or 110', and optionally for long- or short term storage in one or more memories 111, a signal representative of or otherwise useful in determining current power output of the engine 200. EEC 110 may process such signals into any form suitable for further processing in calculating a desired fuel flow rate and preparing any desired control command signals.

At 404 a determination may be made as to whether the power reading obtained or determined at 402 indicates that a change in power has occurred. For example, a primary reading of power output of shaft 218 made at 402 can be compared with data representing a previous output reading previously stored in persistent or volatile digital memory 111 by EEC 110. From such comparison it can be determined, visually or automatically, that power output is indicated to have increased or decreased, or to be desired. A visual determination may be made, for example, by providing suitable output signals EEC 110 to a cockpit display for review by a pilot, who can, by repeatedly checking the display, determine that a change in engine output power is indicated. For further example, a signal representing a second or subsequent differential engine oil pressure can be obtained, using a suitably-configured transducer, such as differential oil pressure transducer 300 of FIG. 2, data processor 110, and volatile and/or persistent data storage 111, and compared to one or more previously-acquired signals, using suitably programmed mathematical algorithms, to determine whether a change in the monitored differential engine oil pressure is indicated to have occurred. Such information mayor may not be communicated to a pilot of the aircraft by EEC 110, 110'.

If at 404 it is determined that no change in engine power output is indicated, at 405, the process can return to 402. For example, in an embodiment using an automatic data processor control in an EEC, process control can be returned to logic block 402 for one or more subsequent readings of engine power output indicators, so that continual monitoring of engine power output can be maintained; at any pass through logical blocks 402, 404, where a change in engine output power is indicated, control can proceed to block 406.

If at 404 it is indicated that a change in engine power output has occurred relative to one or more previous power readings, or if it desired to confirm that in fact no change has occurred, at 406 data representing a secondary, or confirmatory, power and/or fuel control parameter may be acquired, for use in confirming that a change in power has actually occurred. Such secondary parameter reading(s) can be used to affirm or contradict the change in power output indicated at 404.

For example, it is possible, under some circumstances, particularly where an indirect measure of power output is used, that an erroneous change in power output may have been indicated at 404. For example, during certain maneuvers of an aircraft or other vehicle, such as a zero-g or a negative-g aircraft operation (which may be encountered for example during turbulence or in sudden descents), acceleration of oil within the oil tank may cause an incorrect oil pressure reading, which, if differential oil pressure is being used as an indicator of engine power output, can result in an incorrect indication of a power change—either, for example, by indicating that a change has occurred when in fact none has, or by exaggerating or minimizing the indication of a true power change. For example, in such circumstances oil may be accelerated away from the bottom of the tank where the oil pump is located, causing the oil pump to cavitate, with a consequent drop in MOP. Such a drop in MOP can in turn result in a loss of differential oil pressure which is not necessarily connected with a change in engine power output. This is illustrated, for example, in FIG. 6, which represents a plot of oil pressure and vertical acceleration versus time during a negative-g maneuver by an aircraft or other vehicle.

Figure 6:
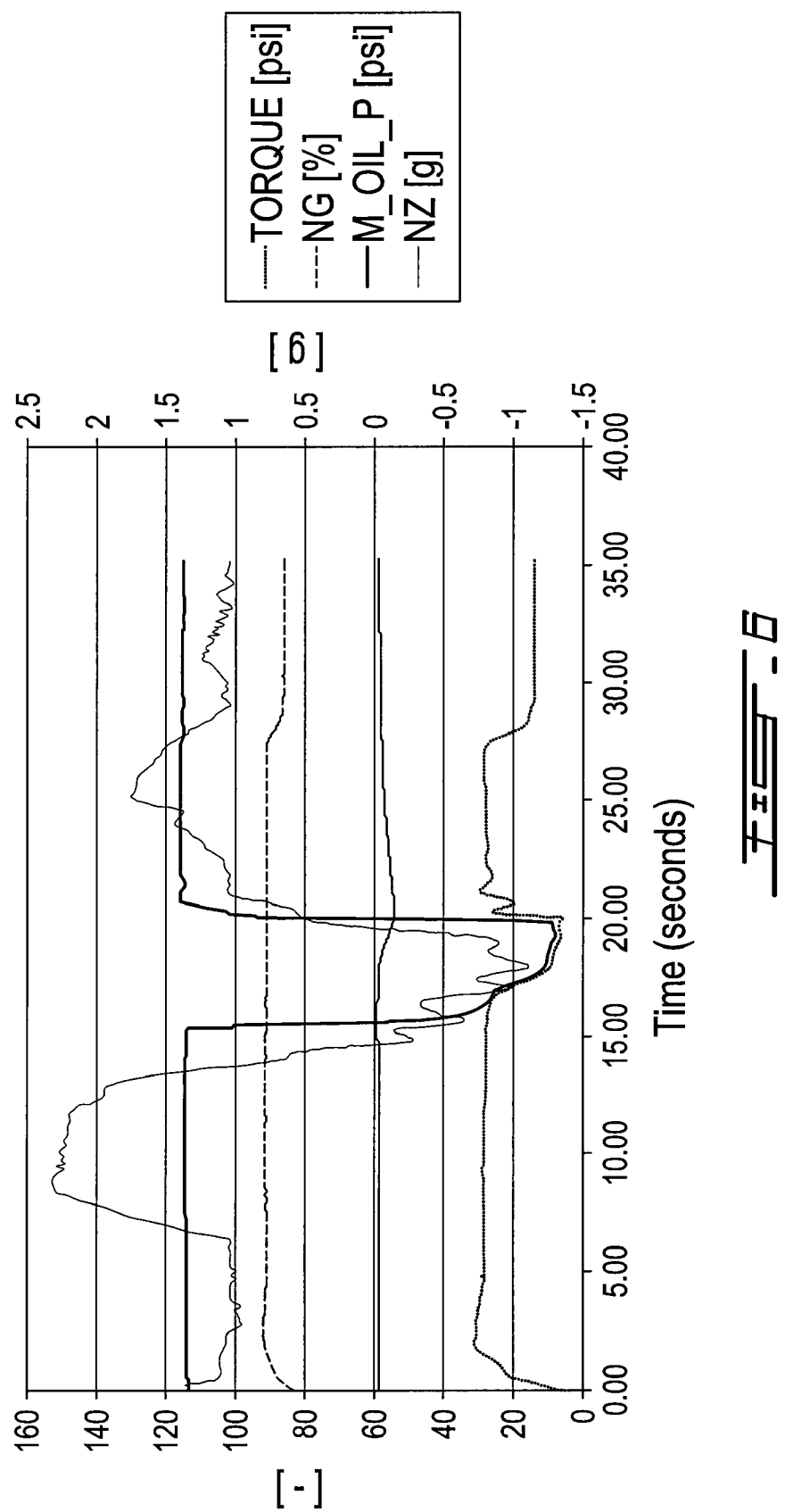
FIG. 6 is a representative plot of oil pressure and vertical acceleration versus time during a negative-g maneuver by an aircraft.

FIG. 6 illustrates the effect of vertical accelerations on a number of parameters that can be used to confirm whether an indicated change in engine power output has in fact occurred. As may be seen in the Figure, factors such as main oil pressure (MOP) can be significantly correlated with vertical acceleration (NZ), and therefore can be useful as in confirming whether an indicated power change might be erroneous, and in fact indicate a change in vertical accelerations. Other factors, such as gas generator speed Ng (NG) are less strongly correlated to vertical acceleration, and therefore can be useful in confirming that in fact no change in output power is likely to have taken place, despite an indication to the contrary.

Those skilled in the relevant arts will understand that the utility of various operating parameters in verifying engine performance will depend upon the construction of a particular vehicle, the operating conditions, and other factors. The identification and use of many such factors should not present significant difficulties, once such persons have been made familiar with this disclosure.

Thus where at 404 it is indicated that a change in engine power output has occurred relative to one or more previous power readings, at 406, a secondary power and/or fuel control parameter may be acquired, for use in confirming that a change in engine output power has actually occurred, or has occurred at a desired level. This can be useful, for example, when no change in power setting is desired, as for example where a FADEC or other system is configured to provide a desired constant power output: to change power when, for example, in fact no change is desired, or appropriate, and none has in fact taken place, could cause inconvenient and even dangerous changes in actual engine power settings. It can also be useful where, for example, a desired change in engine power has been requested, but subsequent changes in aircraft operating conditions cause an apparent change in engine power output that is not accurate.

As an example of the use of a secondary or confirmatory parameter to confirm whether a change in engine power output has occurred, or has occurred within a desired limit, one or more signals 382 representing acceleration of one or more parts of the aircraft can be acquired and interpreted, to determine whether the apparent power change determined at 404, or any part of such apparent power change, is accurate. For example, signals representing acceleration of the aircraft at, for example, the location of the engine may be obtained, or determined using acceleration at one or more other points, transposed mathematically to the location of the engine to determine whether the engine or any part of it is subject to acceleration that might cause an erroneous power indication.

For example, one or more locations on the aircraft or other vehicle may be equipped with one or more accelerometers 104, 382 (FIGS. 1,2), which would provide various components of aircraft vertical, horizontal, and rotational acceleration to EEC 110 or other flight control computer. Such parameter(s) (possibly along with other air data parameters such as air speed and altitude) may in turn be communicated to the engine EEC via a data bus or other digital or analog communications means 106, 108. Again, such secondary parameter(s) may be used to determine whether a change in differential oil pressure detected at 404 is due to aircraft operations rather than a change in output power.

In other embodiments, secondary parameter(s) obtained at 406 may include inputs from other sensors 104, such as gas generator speed or inter turbine temperature ITT. Engine power output may be calculated based on these inputs using, for example, a digitized engine performance module within software stored in or otherwise executed by the EEC 110. This may then be compared to the power output determined at 402 and/or to previous power output readings in order to determine whether a change in power has occurred or is correctly indicated at 402.

It is also possible to use pilot-initiated control inputs as primary or secondary indicators of desired power settings. For example, control input from PCL RVDT 104,392 can be used to indicate a desired output setting.

At 408 it is determined whether or not actual engine power output needs to be modified to meet current intended flight commands, and if so, to what extent. For example, data signals representing actual power output may be compared to data signals representing desired power output, using known computer algorithms. It having been determined whether the power setting indicated at 402 is correct or needs correction, control of the process 400 can be transferred to logic block 412.

As mentioned above, where it is determined at 408 that actual power output requires correction, the power output can be modified by increasing or decreasing the fuel flow f. At 412, the fuel flow f required to compensate for any difference in indicated and desired or otherwise commanded power settings is calculated. As will be understood by those skilled in the relevant arts, calculation of the desired f will depend upon a number of factors, including the type and model of engine used, the type and model of aircraft or other vehicle in which it is installed, the operating conditions of the engine and vehicle, the type of fuel used and its condition, and optionally others.

At 414, signals representing the calculated desired or required fuel flow f is output by the EEC system, for use, for example, in providing output command signals for a fuel pump or other device, and control of process 400 can return to 402.

If it is determined at 408 that a change in power is not desired, then control of the process 400 passes to logic block 410, at which the current fuel flow f may be held constant for a fixed or other determined time interval (for example, ten seconds) and control of the process 400 can returns to control block 402.

Where an erroneous change in power output had been detected at 404, the time interval applied at 410 is preferably long enough to allow the situation which caused the erroneous output power detection to pass, but in any case is preferably short enough to prevent the development of other possibly detrimental changes in flight or other vehicle conditions. For example, in the event that a momentary loss or reduction of MOP is experienced, as mentioned above and shown in FIG. 6, and a corresponding loss of differential oil pressure also occurs, at 410 the engine fuel flow may be held for a predetermined period long enough to give both the MOP and the differential oil pressure a chance stabilize, so long as no danger to flight safety has a chance to arise. After the designated time interval has passed, if the MOP and differential oil pressure have not recovered (i.e. signaling some other issue such as sensor failure), the engine power may be reduced, engine control may be governed using another input parameter, such as gas generator speed or inter turbine temperature (ITT) and/or the aircraft may fly in a degraded mode. Alternatively, in addition to or in lieu of using predetermined intervals of fixed length, various parameters 102, 104 can be monitored to determine when a condition giving rise to erroneous power readings has abated, so that control can be resumed based on primary power indication factors.

Suitable methods and algorithms for determining fixed or variable time intervals for application at block 410 in holding current fuel flow f constant are known, and their use will be within the scope of those skilled in the relevant arts, once they have been made familiar with this disclosure.

FIG. 5 provides a schematic diagram of another embodiment, 500, of a process for controlling a fuel supply to a turbine or other engine according to the disclosure, suitable for implementation using systems and devices disclosed herein, including for example engine 200 of FIG. 1 and system 100 as described. Many of the individual process steps 502, 504, etc., are similar in form and alternative to various steps of process 400, and form, to some degree, corresponding parts of process 500. Thus in many cases the description below details only those portions of process 500 which differ significantly from their counterparts in process 400.

At 502, a current value or level of power output of the engine 200 is determined. For example, a direct reading of power output of shaft 218 can be determined using, for example, a mechanical means such as a phase shift torque probe. Alternatively, an indirect or proportional measure of power output may be employed as a surrogate control parameter using, for example, one or more of sensors 102 providing signals representing anyone or more of a number of parameters (as, for example, disclosed herein). For example, as shown at 402 a differential oil pressure across an RGB may be obtained, using a transducer such as differential oil pressure transducer 102, 300 of FIG. 2 to provide for processing by EEC(s) 110, 110' and optionally for long- or short term storage in one or more memories 111, a signal representative of or otherwise useful in determining current power output of the engine 200. EEC(s) 110, 110' may process such signals into any form suitable for further processing in calculating a desired fuel flow rate and preparing any desired control command signals.

At 504 an output signal representing a parameter useful in confirming the accuracy of the power output indication determined at 502 is obtained. For example, signals representing one or more additional flight and/or engine operating conditions, including for example acceleration, altitude, temperature, or other parameters (as for example described herein), may be obtained, using for example one or more transducers 104, and provided to EEC(s) 110, 110'.

At 506, using data acquired at 502, 504, EEC(s) 110,110' can determine whether the current fuel flow rate f is correct, in view of current power command settings obtained from, for example, power settings set by a pilot using a control input such as PCL RVDT 104, 390 or by an automatic flight control system. For example, as described herein data representing a differential oil pressure obtained at 502 is used by EEC(s) 110, 110' executing suitably-configured power setting software, to determine a corresponding apparent engine power output; and the secondary data acquired at 504 is used, as described herein, to confirm whether the power setting determined using the value acquired at 502 is correct.

Once the actual power output determined by comparing the values acquired at 502, 504 is determined, at 508 EEC 110 can compare the actual power setting to command power settings indicated by cockpit controls or other sources, and as described herein a corresponding suitable fuel flow rate f may be determined and at 510 used to provide corresponding command signals to a fuel control unit 114 (FIG. 1) or other device.

If either at 506 the current fuel flow rate f is determined to be correct or suitable output command signals have been provided at 510, control can return to 502 so that continuous or continual monitoring of engine operating conditions may be maintained.

The above descriptions are meant to be exemplary only, and those skilled in the relevant arts will recognize that changes may be made to the embodiments described without departing from the scope of the subject matter disclosed. Still other modifications which fall within the scope of the described subject matter will be apparent to those skilled in the art, in light of a review of this disclosure, and such modifications are intended to fall within the appended claims.

Unless specified herein, or inherently required by the processes themselves, the order of steps shown in processes disclosed is not significant, and such order may be changed without departing from the meaning or scope of the disclosure.

What is claimed is:

1. A method of controlling a fuel supply for an aircraft-mounted turbine engine, the method comprising:
   monitoring a differential oil pressure associated with an operating engine, the differential engine oil pressure determined using signals representing at least two measured operating engine oil pressures, to determine whether a change in the monitored differential engine oil pressure has occurred;
   upon determining that a change in the monitored differential engine oil pressure has occurred, using signals representing at least one other aircraft or engine operating parameter to determine whether the change in differential engine oil pressure corresponds to a desired change in an output power level for the engine; and
   if it is determined that the change in differential engine oil pressure does not correspond to a desired change in an output power level for the engine, one of:
   calculating a desired fuel flow rate for the engine and providing a corresponding command signal to an engine fuel supply controller; and
   holding a current fuel flow rate to the engine for a determined time interval.

2. The method of claim 1, wherein the at least one other operating parameter comprises an acceleration of at least one portion of an aircraft.

3. The method of claim 1, wherein the at least one other aircraft of engine operating parameter comprises at least one of an engine operating temperature, and engine operating pressure, and air temperature, and an air pressure.

4. The method of claim 1, wherein the corresponding command signal provided to an engine fuel supply controller comprises signals adapted to modify a rate of fuel flow provided to the engine.

5. A controller for a fuel supply for an aircraft-mounted turbine engine, the controller adapted to:
   receive from at least one transducer input signals representing a differential engine oil pressure;
   receive from at least one other transducer input signals representing at least one other aircraft or engine operating parameter; and
   using the input signals representing the differential engine oil pressure, determine whether a change in the differential engine oil pressure has occurred;
   using input signals representing the at least one operating parameter, determine whether the determined change in differential engine oil pressure corresponds to a desired change in an output power level for the engine; and
   upon determining that the determined change in differential engine oil pressure does not correspond to a desired change in an output power level for the engine, one of:
   calculate a desired fuel flow rate for the engine and provide a corresponding output signal useful for controlling an engine fuel supply; and
   hold a current fuel flow rate to the engine for a determined time interval.

6. The controller of claim 5, wherein the at least one other transducer comprises an accelerometer.

7. The controller of claim 5, wherein the at least one other transducer comprises at least one of a temperature transducer, and a pressure transducer.

8. The controller of claim 5, wherein the corresponding output signal is adapted to modify a rate of fuel flow provided to an engine.

* * * * *